US012801066B2

(12) United States Patent
Omori et al.

(10) Patent No.: US 12,801,066 B2
(45) Date of Patent: Nov. 17, 2026

(54) TRANSFER BELT, BELT UNIT, AND IMAGE FORMING APPARATUS

(71) Applicant: FUJIFILM Business Innovation Corp., Tokyo (JP)

(72) Inventors: Kenji Omori, Kanagawa (JP); Masato Ono, Kanagawa (JP); Jun Kimura, Kanagawa (JP)

(73) Assignee: FUIJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 19/023,179

(22) Filed: Jan. 15, 2025

(65) Prior Publication Data

US 2025/0334904 A1 Oct. 30, 2025

(30) Foreign Application Priority Data

Apr. 30, 2024 (JP) ................................ 2024-073968

(51) Int. Cl.
*G03G 15/16* (2006.01)

(52) U.S. Cl.
CPC ....... *G03G 15/162* (2013.01); *G03G 15/1615* (2013.01)

(58) Field of Classification Search
CPC ....... G03G 15/1685; G03G 2215/1623; G03G 15/162
See application file for complete search history.

(56) References Cited

U.S. PATENT DOCUMENTS 9,110,409 B2 * 8/2015 Hayami ............... G03G 15/162
2017/0242373 A1 * 8/2017 Matsushima ........ G03G 15/162
2018/0136589 A1 * 5/2018 Sakamoto ............ G03G 15/162
2020/0326645 A1 10/2020 Tanaka et al.
2022/0397845 A1 * 12/2022 An ..................... G03G 15/1675

FOREIGN PATENT DOCUMENTS

JP 4656297 3/2011
JP 2014081594 5/2014
JP 6241270 12/2017
JP 2020086013 6/2020
JP 6929767 9/2021

OTHER PUBLICATIONS

"Search Report of Europe Counterpart Application", issued on Jul. 17, 2025, p. 1-p. 9.

* cited by examiner

*Primary Examiner* — Jessica L Eley
(74) *Attorney, Agent, or Firm* — JCIPRNET

(57) ABSTRACT

A transfer belt includes three layers of a front surface layer, a base material layer including at least one elastic material selected from the group including rubber and an elastomer, and a back surface layer, in which a relationship between a volume resistivity R1 of the front surface layer, a volume resistivity R2 of the base material layer, and a volume resistivity R3 of the back surface layer in an environment of 25° C. and 55% RH satisfies Expression 1 or 2.

$$R1 > R2 > R3 \quad \text{Expression 1}$$

$$R1 < R2 < R3 \quad \text{Expression 2}$$

18 Claims, 4 Drawing Sheets

TRANSFER BELT, BELT UNIT, AND IMAGE FORMING APPARATUS

CROSS-REFERENCE TO RELATED APPLICATIONS

This application is based on and claims priority under 35 USC 119 from Japanese Patent Application No. 2024-073968 filed Apr. 30, 2024.

BACKGROUND

(i) Technical Field

The present disclosure relates to a transfer belt, a belt unit, and an image forming apparatus.

(ii) Related Art

In an electrophotographic image forming apparatus, a belt in which a resin layer is laminated on a base material layer is used as a belt for transferring an image to a recording medium.

For example, JP2020-086013A discloses an intermediate transfer belt including a primer layer and a coat layer in this order on a base material layer, in which the base material layer contains a resin having a carbonyl group, the primer layer contains a silane coupling agent having a nitrogen atom, and the coat layer contains a compound having a structure represented by the following General formula (1).

In addition, JP6241270B discloses a transfer belt including an elastic layer and a front surface layer that are overlapped in this order, in which a breaking elongation of the front surface layer is 7% to 60%, and a tensile elastic modulus of the front surface layer is 100 to 1000 MPa.

Further, JP6929767B discloses a transfer belt for an image forming apparatus including a front surface layer that is formed of a resin composition including a silicone-acrylic copolymer resin and a urethane resin as a major component.

SUMMARY

Aspects of non-limiting embodiments of the present disclosure relate to a transfer belt having excellent image transfer performance as compared with a transfer belt in which a volume resistivity R1 of a front surface layer, a volume resistivity R2 of a base material layer, and a volume resistivity R3 of a back surface layer do not satisfy both Expressions 1 and 2, a belt unit including the transfer belt, and an image forming apparatus.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the above problems include the following aspect.

According to an aspect of the present disclosure, there is provided a transfer belt including three layers of a front surface layer, a base material layer including at least one elastic material selected from the group consisting of rubber and an elastomer, and a back surface layer, in which a relationship between a volume resistivity R1 of the front surface layer, a volume resistivity R2 of the base material layer, and a volume resistivity R3 of the back surface layer in an environment of 25° C. and 55% RH satisfies Expression 1 or 2.

$$R1 > R2 > R3 \quad \text{Expression 1}$$

$$R1 < R2 < R3 \quad \text{Expression 2}$$

BRIEF DESCRIPTION OF THE DRAWINGS

Exemplary embodiment(s) of the present invention will be described in detail based on the following figures, wherein:

FIGS. 1A and 1B are diagrams showing an example of a circular electrode, in which FIG. 1A is a schematic plan view, and FIG. 1B is a schematic cross-sectional view;

DETAILED DESCRIPTION

Figure 1A:
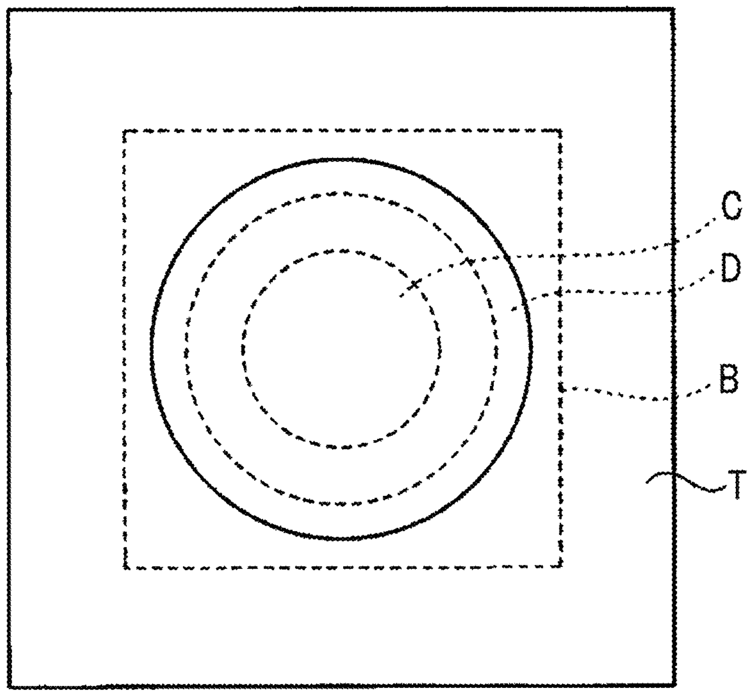

Hereinafter, exemplary embodiments of the present disclosure will be described. The following descriptions and examples merely illustrate the exemplary embodiments, and do not limit the scope of the exemplary embodiments.

In the present disclosure, a numerical range described using "to" represents a range including numerical values listed before and after "to" as the minimum value and the maximum value respectively.

Regarding the numerical ranges described in stages in the present disclosure, the upper limit value or lower limit value of a numerical range may be replaced with the upper limit value or lower limit value of another numerical range described in stages. Furthermore, in the present disclosure, the upper limit value or lower limit value of a numerical range may be replaced with values described in examples.

In the present disclosure, in a case where an exemplary embodiment is described with reference to drawings, the configuration of the exemplary embodiment is not limited to the configuration shown in the drawings. In addition, the sizes of members in each drawing are conceptual and a relative relationship between the sizes of the members is not limited thereto.

In the present disclosure, each component may include a plurality of kinds of corresponding substances. In a case where the amount of each component in a composition is mentioned in the present disclosure, and there are plurality of kinds of substances corresponding to each component in the composition, unless otherwise specified, the amount of each component means the total amount of plurality of kinds of the substances present in the composition.

Transfer Belt

A transfer belt according to an exemplary embodiment of the present disclosure has three layers of a front surface layer, a base material layer including at least one elastic material selected from the group consisting of rubber and an elastomer, and a back surface layer.

A relationship between a volume resistivity R1 of the front surface layer, a volume resistivity R2 of the base material layer, and a volume resistivity R3 of the back surface layer in an environment of 25° C. and 55% RH satisfies Expression 1 or 2.

$$R1 > R2 > R3 \quad \text{Expression 1}$$

$$R1 < R2 < R3 \quad \text{Expression 2}$$

Hereinafter, the transfer belt according to the exemplary embodiment of the present disclosure is also simply referred to as "belt according to the present disclosure".

The belt according to the present disclosure is a belt involved in both the transportation of a recording medium such as paper and the transfer of a toner image to a recording medium.

Specifically, the belt according to the present disclosure is applied to a belt that is arranged to face an intermediate transfer belt and transports a recording medium to a secondary transfer unit, in an image forming apparatus that primarily transfers a toner image formed on a surface of an image carrier (specifically, also referred to as an electrophotographic photoreceptor or photoreceptor) to the intermediate transfer belt, and then secondarily transfers the toner image from the intermediate transfer belt to the recording medium. Further, the belt according to the present disclosure is applied to a belt that is arranged to face an image carrier and transports a recording medium to a transfer unit, in an image forming apparatus that directly transfers a toner image formed on a surface of the image carrier to the recording medium.

The transfer belt that is used in an electrophotographic image forming apparatus transports a recording medium while electrostatically attracting the recording medium to the surface thereof at the transfer unit, and also contributes to the transfer of a toner image to the recording medium that is transported, as described above. In addition, the transfer belt is desired to have image transfer performance.

The image transfer performance is often affected, for example, in a case where abnormal discharge occurs in the transfer unit (for example, the transfer unit between the intermediate transfer belt and the image carrier) or in a case where the transfer conditions are changed depending on the type of recording medium, the environment, and the like.

Therefore, as a result of conducting studies, the present inventors have found that, by having a configuration in which the three layers of the front surface layer, the base material layer including an elastic material, and the back surface layer are provided and the volume resistivity of the three layers satisfies a relationship of Expression 1 (R1>R2>R3) or Expression 2 (R1<R2<R3), the image transfer performance can be improved.

In a case where the belt according to the present disclosure satisfies the relationship of Expression 1, the volume resistivity is high in the order of the front surface layer, the base material layer, and the back surface layer. In this case, a configuration is adopted in which the front surface layer having the highest resistance maintains the charging performance and the transfer current flowing from the front surface layer side easily passes from the front surface layer to the back side of the belt through the base material layer and the back surface layer. That is, a configuration is adopted in which the charge of the transfer current does not remain in the belt too much while maintaining the required charging performance.

On the other hand, in a case where the belt according to the present disclosure satisfies the relationship of Expression 2, the volume resistivity is low in the order of the front surface layer, the base material layer, and the back surface layer. In this case, a configuration is adopted in which the back surface layer having the highest resistance maintains the charging performance, and the transfer current flowing from the front surface layer side easily flows from the front surface layer to the base material layer and the back surface layer side. That is, as in the case where the relationship of Expression 1 is satisfied, a configuration is adopted in which the charge of the transfer current does not remain in the belt too much while maintaining the required charging performance.

In this manner, by adopting the configuration in which the charge of the transfer current does not remain in the belt too much while maintaining the required charging performance, the transferability of the toner image to the recording medium is improved, that is, transfer performance is improved.

The exemplary embodiments of the present disclosure will be described in detail below.

Volume Resistivity of Front Surface Layer, Base Material Layer, and Back Surface Layer In the belt according to the present disclosure, a relationship between the volume resistivity R1 of the front surface layer, the volume resistivity R2 of the base material layer, and the volume resistivity R3 of the back surface layer in an environment of 25° C. and 55% RH satisfies Expression 1 or Expression 2.

$$R1 > R2 > R3 \quad \text{Expression 1}$$

$$R1 < R2 < R3 \quad \text{Expression 2}$$

By satisfying Expression 1 or Expression 2, the transferability of the toner image to the recording medium can be improved.

From the viewpoint of further improving the transferability of the toner image to the recording medium, the difference between the volume resistivity R1 of the front surface layer and the volume resistivity R2 of the base material layer, and the difference between the volume resistivity R2 of the base material layer and the volume resistivity R3 of the back surface layer are, for example, both preferably 0.1 log Ω or more, and more preferably 0.2 log Ω or more.

On the other hand, from the viewpoint of maintaining a high transfer efficiency during high-speed transfer, the upper limit value of the difference between the volume resistivity R1 of the front surface layer and the volume resistivity R2 of the base material layer and the upper limit value of the difference between the volume resistivity R2 of the base material layer and the volume resistivity R3 of the back surface layer are, for example, both preferably 1.0 log Ω or less, and more preferably 0.8 log Ω or less.

Examples of the method for adjusting the relationship between the volume resistivity of the front surface layer, the volume resistivity of the base material layer, and the volume resistivity of the back surface layer include a method for adjusting the amount of the conductive filler contained in each of the front surface layer and the back surface layer.

Volume Resistivity of Entire Belt

In the belt according to the present disclosure, the volume resistivity of the entire belt in an environment of 25° C. and 55% RH is, for example, preferably 8.0 log Ω or more and 11.0 log Ω or less, and more preferably 8.5 log Ω or more and 10.0 log Ω or less.

In a case where the volume resistivity of the entire belt is 8.0 log Ω or more, the belt can maintain the charging performance and the transferability of the toner image to the recording medium is improved. In addition, in a case where the volume resistivity of the entire belt is 11.0 log Ω or less, the transfer current flowing through the belt easily passes to the back side of the belt, and thus the transferability of the toner image to the recording medium can be improved from this viewpoint as well.

Method for Measuring Volume Resistivity

Hereinafter, a method for measuring the volume resistivity will be described.

In each of the belt, the front surface layer, the base material layer, and the back surface layer according to the present disclosure, measurement points are a total of 18 points of 6 points at equal intervals in a circumferential direction of the belt or each layer and 3 points at the central portion and both end portions in a width direction of the belt or each layer. The arithmetic mean value of these 18 measured values is adopted.

The volume resistivity of the belt, the front surface layer, the base material layer, and the back surface layer according to the present disclosure is measured as follows.

Figure 1B:
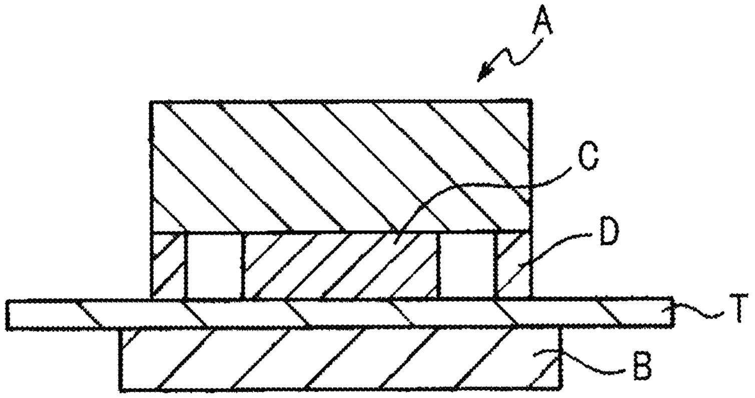

A circular electrode (for example, UR Probe of Hiresta IP manufactured by Mitsubishi Yuka Co., Ltd.) is used to perform measurement according to JIS K 6911:1995. The method for measuring the volume resistivity will be described using FIGS. 1A and 1B. FIGS. 1A and 1B are a schematic plan view and a schematic cross-sectional view showing an example of a circular electrode. The circular electrode shown in FIGS. 1A and 1B includes a first voltage applying electrode A and a second voltage applying electrode B. The first voltage applying electrode A includes a columnar electrode part C, and a cylindrical ring-shaped electrode part D having an inner diameter larger than the outer diameter of the columnar electrode part C and surrounding the columnar electrode part C with a constant interval therebetween. Then, a current I (A) flowing when a belt T is clamped between the columnar electrode part C and the ring-shaped electrode part D of the first voltage applying electrode A and the second voltage applying electrode B and a voltage V (V) is applied between the columnar electrode part C of the first voltage applying electrode A and the second voltage applying electrode B is measured, and volume resistivity ρv (Ω·cm) of the belt T is calculated by the following expression. Here, in the following expression, t represents the thickness of the measurement sample (that is, the belt, the front surface layer, the base material layer, or the back surface layer).

$$\rho v = 19.6 \times (V/I) \times t \qquad \text{Expression}$$

The volume resistivity is calculated by obtaining a current value after application of a voltage of 500 V for 10 seconds under the environment of 22° C./55% RH by using a circular electrode (UR probe of Hiresta IP manufactured by Mitsubishi Yuka Co., Ltd.: outer diameter Φ16 mm of the columnar electrode part C, and inner diameter Φ30 mm and outer diameter Φ40 mm of the ring-shaped electrode part D).

19.6 shown in the above expression is an electrode coefficient for conversion to resistivity, and is calculated as $\pi d^2/4t$ from the outer diameter d (mm) of the columnar electrode part and the thickness t (cm) of the measurement sample.

Further, the thicknesses of the belt, the front surface layer, the base material layer, and the back surface layer, which are measurement samples, are all measured using an eddy current type thickness meter CTR-1500E manufactured by SANKO ELECTRONIC LABORATORY CO., LTD. At this time, the thickness is measured at any one position.

As described above, since the measurement points (that is, the number of measurement samples) are 18 points, the arithmetic mean value of the thicknesses of the 18 measurement samples can also be set to be the total thickness of the belt, the thickness of the front surface layer, the thickness of the base material layer, or the thickness of the back surface layer.

In a case of obtaining the thicknesses of the front surface layer, the base material layer, and the back surface layer from the belt, any one of the front surface layer, the base material layer, or the back surface layer is polished by a polishing tool such as a file having an extremely fine grain size or more with reference to the thickness of each layer of the cross section portion measured by cross section observation, and cut to obtain a measurement sample. Then, the thickness, volume resistivity, and the like of the obtained measurement sample (the measurement sample of the front surface layer, the base material layer or the back surface layer) may be measured by the method described above.

The volume resistivity of the belt according to the present disclosure, and the front surface layer, the base material layer, and the back surface layer constituting the belt are all controlled by the type of the conductive particles, the type of the conductive agent, the amount of addition thereof, or the like.

Configuration of Belt

Next, the belt according to the present disclosure will be described with reference to FIG. 2. Here, FIG. 2 is a schematic perspective view showing an example of the belt according to the present disclosure.

Figure 2:
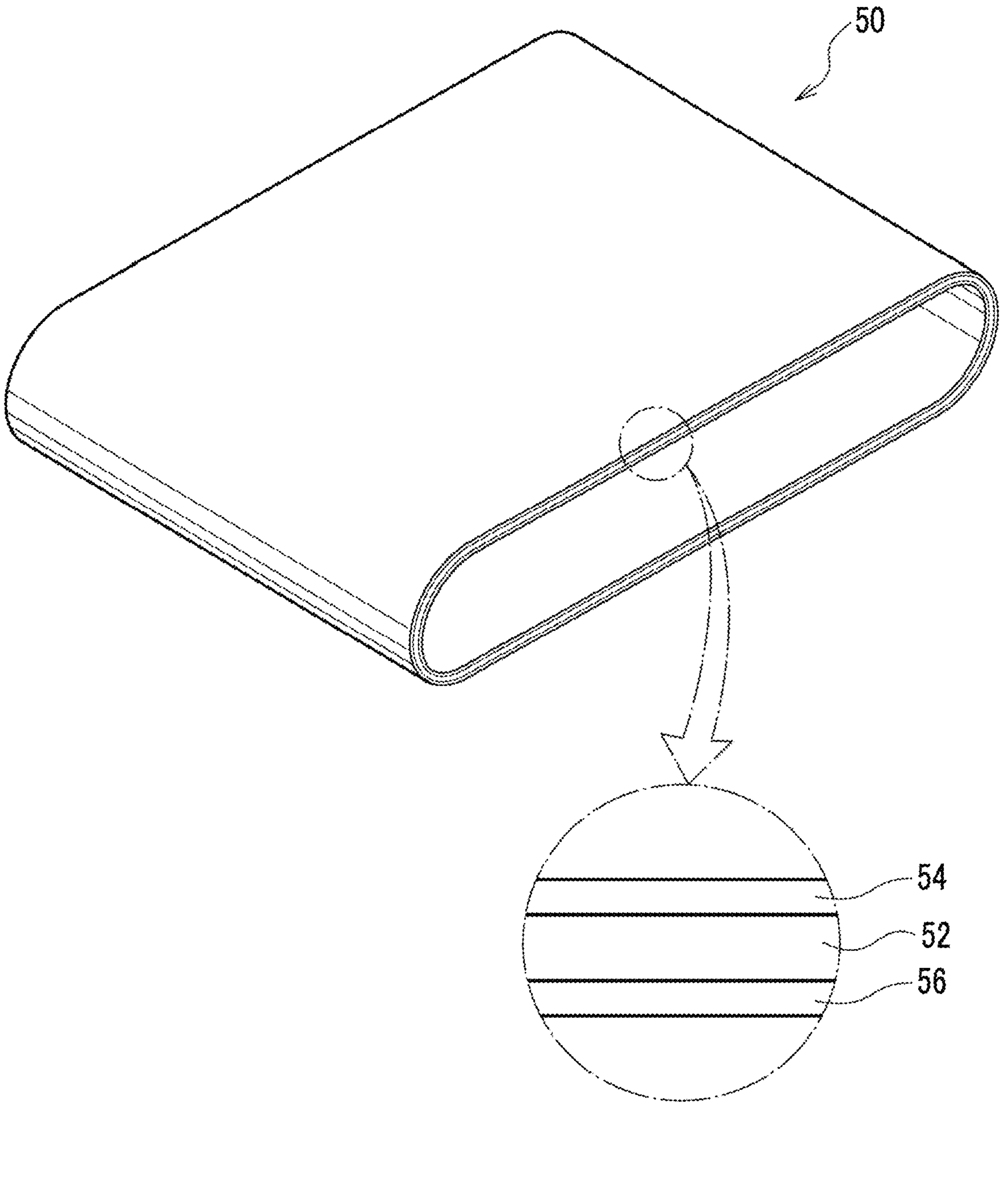
FIG. 2 is a schematic perspective view showing an example of a transfer belt according to the present disclosure.

As shown in FIG. 2, a belt 50 has a base material layer 52, a front surface layer 54, and a back surface layer 56. The front surface layer 54 is a layer provided on the outer peripheral surface of the base material layer 52 and configuring the outer peripheral surface of the belt 50. The back surface layer 56 is a layer provided on the inner peripheral surface of the base material layer 52 and configuring the inner peripheral surface of the belt 50.

The outer peripheral surface of the belt 50 is also called the surface of the belt and corresponds to a transport surface for a recording medium.

Base Material Layer

The base material layer contains at least one elastic material selected from the group consisting of rubber and an elastomer. The base material layer may further contain conductive particles (conductive filler), and may also contain other additives. As the elastic material, one kind may be used alone, or two or more kinds may be used in combination.

Examples of the rubber and elastomer in the elastic material include chloroprene rubber (CR), epichlorohydrin rubber (ECO rubber), urethane elastomers, isoprene rubber, butyl rubber, silicone rubber, fluororubber, styrene-butadiene rubber, butadiene rubber, nitrile rubber (NBR), ethylene propylene rubber, ethylene-propylene-diene ternary copolymer rubber (EPDM), natural rubber, and a mixed rubber thereof.

Among these, from the viewpoint that the ion conductivity is excellent, the voltage dependence of the volume resistivity of the belt can be reduced, and the transferability of the toner image to the recording medium can be improved, for example, it is preferable to contain at least one selected from the group consisting of chloroprene rubber (CR), epichlorohydrin rubber (ECO rubber), and urethane elastomers.

Examples of the conductive particles (conductive filler) contained in the base material layer include carbon black such as Ketjen black, oil furnace black, channel black, and acetylene black; metal particles such as aluminum and nickel; and metal oxide particles such as indium tin oxide, tin oxide, zinc oxide, titanium oxide, and yttrium oxide. As the conductive particles, among these, for example, carbon black is preferable.

As the conductive particles, one kind may be used alone, or two or more kinds may be used in combination.

The average primary particle diameter of the conductive particles (preferably, for example, carbon black) is preferably, for example, 1 nm or more and 500 nm or less, more preferably, 5 nm or more and 200 nm or less, and still more preferably, 10 nm or more and 100 nm or less.

The base material layer may contain a conductive agent other than the conductive particles.

Examples of the conductive agent include an ion conductive material such as potassium titanate, potassium chloride, sodium perchlorate, or lithium perchlorate; and an ion conductive polymer such as polyaniline, polyether, polypyrrole, polysulfone, or polyacetylene.

As the conductive agent other than the conductive particles, one kind may be used alone, or two or more kinds may be used in combination.

The base material layer is preferably, for example, a conductive elastic layer that contains rubber and conductive particles, and more preferably a conductive elastic layer that contains at least one of chloroprene rubber or epichlorohydrin rubber, and carbon black.

The total content of the conductive particles and the conductive agent contained in the base material layer is set preferably, for example, based on the volume resistivity of the entire belt described above.

In a case where the base material layer contains carbon black, the content of carbon black is preferably, for example, 5 parts by mass or more and 40 parts by mass or less with respect to 100 parts by mass of the elastic material.

The base material layer may further contain an additive such as a vulcanization agent, a vulcanization assistant, a vulcanization accelerator, a cross-linking agent, an antioxidant, a flame retardant, a colorant, a surfactant, a dispersant, or a filler.

In addition, the resistivity can be adjusted by using, for example, an insulating or semiconducting filler such as zinc oxide or magnesium oxide as the additive.

From the viewpoint of the durability of the belt, the average thickness of the base material layer is preferably, for example, 50 μm or more, more preferably, 75 μm or more, and still more preferably, 100 μm or more, and from the viewpoint of flexibility and bending resistance of the belt, the average thickness of the base material layer is preferably, for example, 1000 μm or less, more preferably, 700 μm or less, and still more preferably, 500 μm or less.

Front Surface Layer and Back Surface Layer

The front surface layer is a layer that is provided on the outer peripheral surface of the base material layer and configures the outer peripheral surface of the belt. The back surface layer is a layer that is provided on the inner peripheral surface of the base material layer and configures the inner peripheral surface of the belt.

Both the front surface layer and the back surface layer are preferably, for example, layers containing a resin (base resin).

Examples of the base resin include a urethane resin, polyamide, polyimide, polyamide imide, polyether imide, polyether ether ketone, polyphenylene sulfide, polyether sulfone, polyphenyl sulfone, polysulfone, polyethylene terephthalate, polybutylene terephthalate, polyacetal, polycarbonate, polyester, and a mixed resin thereof.

However, from the viewpoint of improving adhesiveness to the base material layer, it is preferable that the front surface layer and the back surface layer each contain, for example, a urethane resin. The urethane resin is generally synthesized by polymerizing polyisocyanate and polyol. It is preferable that the urethane resin includes, for example, a hard segment and a soft segment.

The front surface layer and the back surface layer preferably contain, for example, a conductive filler.

For example, by adjusting the amount of the conductive filler to be contained in the front surface layer and the back surface layer in each of the front surface layer and the back surface layer, the relationship between the volume resistivity of the front surface layer, the volume resistivity of the base material layer, and the volume resistivity of the back surface layer can be adjusted to be within the above-described ranges.

Examples of the conductive filler contained in the front surface layer and the back surface layer include the conductive particles (conductive filler) described above for the base material layer. As the conductive filler, one kind may be used alone, or two or more kinds may be used in combination. In addition, the average primary particle diameter of the conductive filler is also, for example, preferably within the range described above for the base material layer.

The content of the conductive filler in each of the front surface layer and the back surface layer is, for example, preferably 0.1% by mass or more and 8.0% by mass or less, and more preferably 0.5% by mass or more and 4.0% by mass or less.

In a case where the content of the conductive filler in each of the front surface layer and the back surface layer is within the above-described range, the volume resistivity of the entire belt is easily controlled within the above-described range, and the image transfer performance is excellent.

The content of the conductive filler in one layer of the front surface layer and the back surface layer that has a higher volume resistivity is, for example, preferably 0.1% by mass or more and 2.0% by mass or less, and more preferably 0.3% by mass or more and 1.8% by mass or less.

In addition, the content of the conductive filler in the other layer of the front surface layer and the back surface layer that has a lower volume resistivity is, for example, preferably 1.0% by mass or more and 8.0% by mass or less and more preferably 1.5% by mass or more and 4.0% by mass or less.

It is noted that the content of the conductive filler in one layer of the front surface layer and the back surface layer that has a higher volume resistivity is preferably, for example, lower than the content of the conductive filler in the other layer of the front surface layer and the back surface layer that has a lower volume resistivity.

In a case where the content of the conductive filler in one layer of the front surface layer and the back surface layer that has a higher volume resistivity and the content of the conductive filler in the other layer of the front surface layer and the back surface layer that has a lower volume resistivity are within the above-described ranges, the volume resistivity R1 of the front surface layer, the volume resistivity R2 of the base material layer, and the volume resistivity R3 of the back surface layer can be made to satisfy a relationship of Expression 1 or 2, and the image transfer performance is excellent.

The front surface layer and the back surface layer may contain a conductive agent other than the conductive filler. Examples of the conductive agent include the conductive agents described above for the base material layer.

The front surface layer preferably contains, for example, particles of a resin having a siloxane bond (siloxane resin particles).

The content of the particles of the resin having a siloxane bond in the front surface layer is, for example, preferably 1.0% by mass or more and 20.0% by mass or less, and more preferably 2.0% by mass or more and 15.0% by mass or less with respect to the base resin.

In a case where the particles of the resin having a siloxane bond are included in the front surface layer at the above-described content, the transfer of the residual toner (toner remaining on the intermediate transfer belt or the image carrier without being transferred onto the recording medium) onto the surface of the transfer belt is suppressed. As a result, stains on the back surface of the recording medium are suppressed.

Examples of the siloxane resin particles include resins having a polysiloxane structure in a main chain or a side chain.

Specific examples of the siloxane resin particles include thermosetting silicone resin particles, and particles of silicone oil gum, silicone elastomer, and siloxane-modified polyetherimide.

Among these, the siloxane resin particles are, for example, preferably thermosetting silicone resin particles. With this component, the sliding resistance of the sliding surface is lowered and the maintainability of sliding resistance is easily improved.

Here, the thermosetting silicone resin particles are silicone resin particles that are cured by heat and have rubber-like elasticity. It is preferable that the thermosetting silicone resin particles are unmodified thermosetting silicone resin particles, for example, since an affinity with the lubricant is increased and an increase in rotational torque of the belt is easily suppressed.

The silicone rubber is a rubber formed by molding a silicone oil having a molecular weight of 300000 or more into a pellet shape.

The average particle diameter of the siloxane resin particles is, for example, 0.1 μm or more and 10 μm or less. From the viewpoint of improving the maintainability of sliding resistance, the average particle diameter is preferably, for example, 0.5 μm or more and 4 μm or less, and more preferably 1 μm or more and 3 μm or less.

A method for measuring the average particle diameter of the resin particles is as follows. A sample having a cut surface cut along the member thickness direction is obtained from a belt to be measured.

The cut surface of the sample is observed with an electron microscope, an area value of the resin particles is determined by image analysis, and an equivalent circle diameter is calculated from the area value. This equivalent circle diameter is calculated for 100 resin particles. A diameter (D50) taking up 50% in a volume-based cumulative frequency distribution of the obtained equivalent circle diameter is adopted as the average particle diameter of the resin particles.

In addition, for example, it is preferable that the back surface layer also contains particles of a resin having a siloxane bond (siloxane resin particles). The content of the particles of the resin having a siloxane bond in the back surface layer is preferably, for example, in the same range as the content in the front surface layer.

In a case where the particles of the resin having a siloxane bond are included in the back surface layer at the above-described content, friction with the roll member in contact with the inside of the transfer belt is reduced.

Each of the front surface layer and the back surface layer may further contain an additive such as an antioxidant, a cross-linking agent, a flame retardant, a colorant, or a filler.

From the viewpoint of durability of the belt, the average thickness of each of the front surface layer and the back surface layer is preferably, for example, 0.1 μm or more, more preferably, 0.5 μm or more, and still more preferably, 1 μm or more, and from the viewpoint of flexibility and bending resistance of the belt, the average thickness of each of the front surface layer and the back surface layer is preferably, for example, 50 μm or less, more preferably, 20 μm or less, and still more preferably, 10 μm or less.

The compositions of the front surface layer and the back surface layer may be the same or different from each other.

The thicknesses of the front surface layer and the back surface layer may be the same or different from each other.

Method for Manufacturing Belt

As a method for manufacturing the belt according to the present disclosure, for example, a manufacturing method in which a tubular member to become a base material layer is prepared and a front surface layer and a back surface layer are formed on the outer peripheral surface of the tubular member may be adopted.

A method for manufacturing the tubular member is, for example, extrusion molding in which a composition containing a polymer material to become an elastic material and conductive particles (conductive filler) is melted, extruded in a belt shape from a die, and solidified; injection molding in which a composition containing a polymer material and conductive particles is melted and placed in a belt-shaped mold and solidified; coating molding in which a composition containing a precursor or monomer of a polymer material and conductive particles is applied to a core and solidified; or the like. Heating for the purpose of vulcanization of rubber may be performed at an appropriate time in the molding process.

A method for forming the front surface layer and the back surface layer is, for example, applying a liquid composition containing a polymer material to become a resin (base resin) and a conductive filler (may further contain siloxane resin particles) to the outer peripheral surface or the inner peripheral surface of the tubular member and solidifying the liquid composition; applying a liquid composition containing a precursor or a monomer of a polymer material and a conductive filler (may further contain siloxane resin particles) to the outer peripheral surface or the inner peripheral surface of the tubular member and solidifying the liquid composition; or the like. In order to solidify the liquid composition, drying, heating, electron beam irradiation, or ultraviolet irradiation may be performed depending on the types of the components.

Belt Unit

The belt unit according to the present disclosure includes a transfer belt, and a plurality of rolls around which the transfer belt is wound in a state in which a tension is applied, at least one roll of the plurality of rolls is a drive roll that rotates the transfer belt, and the belt unit is attachable to and detachable from an image forming apparatus. Here, the above-described belt according to the present disclosure is applied as the transfer belt.

Figure 3:
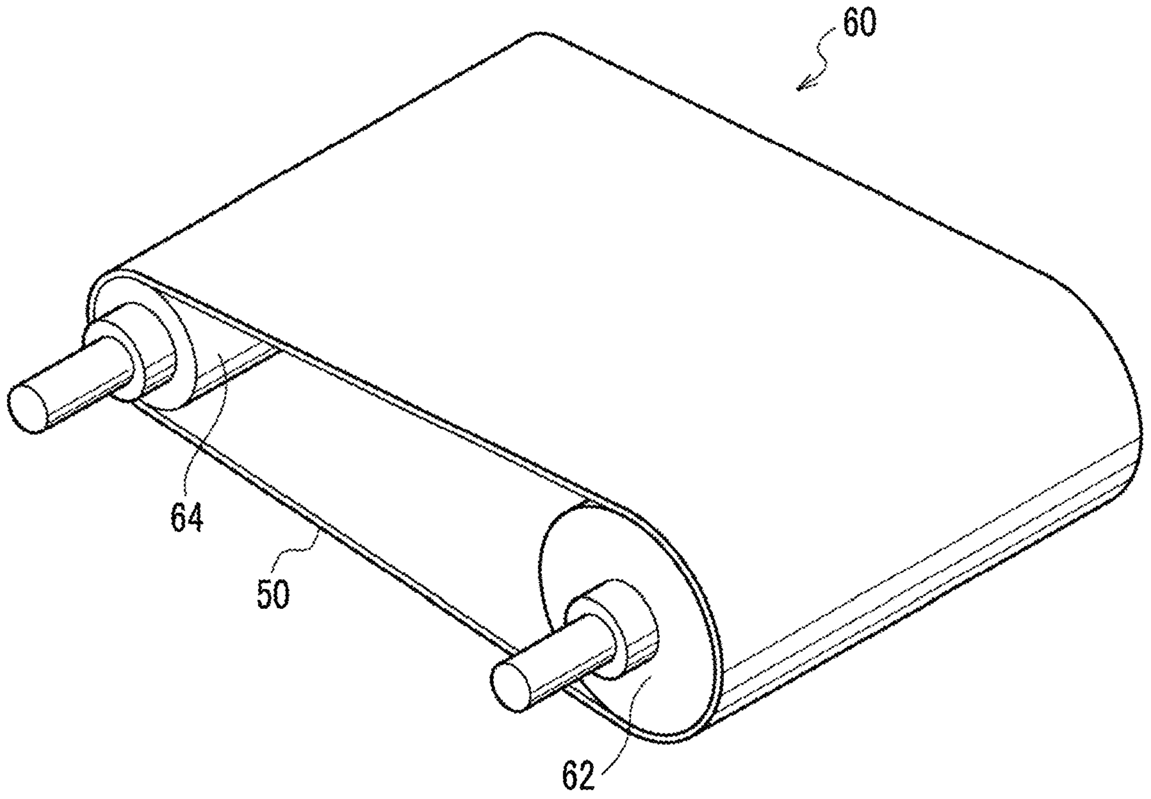
FIG. 3 is a schematic perspective view showing an example of a belt unit according to the present disclosure.

FIG. 3 is a schematic perspective view showing an example of the belt unit according to the present disclosure. Here, FIG. 3 is a schematic perspective view showing a state in which the transfer belt is wound around a plurality of roll members.

As shown in FIG. 3, a belt unit 60 includes a transfer belt 50, a drive roll 62, and a support roll 64, and has a form in which the transfer belt 50 is wound around the drive roll 62 and the support roll 64 in a state where a tension is applied (also referred to as "stretched form" in the present disclosure).

The drive roll 62 is rotated by the power of a driving unit (not shown) connected to the drive roll 62. The transfer belt 50 and the support roll 64 rotate in accordance with the rotation of the drive roll 62.

The belt unit 60 is used by being incorporated into an electrophotographic image forming apparatus as a part of a transfer unit. The belt unit 60 is suitable for, for example a secondary transfer belt unit. In the belt unit, the number of roll members on which the transfer belt is stretched is not limited to two, and may be three or more.

Image Forming Apparatus

An image forming apparatus according to the present disclosure includes an image carrier, a charging unit that charges a surface of the image carrier, an electrostatic charge image forming unit that forms an electrostatic charge image on the charged surface of the image carrier, a developing unit that accommodates a developer containing toner and develops the electrostatic charge image formed on the surface of the image carrier by using the developer to form a toner image, and a transfer unit that includes the belt unit according to the present disclosure and transfers the toner image to a recording medium. The transfer unit includes, for example, an intermediate transfer member, a primary transfer unit that transfers the toner image to a surface of the intermediate transfer member, and a secondary transfer unit that transfers the toner image transferred to the surface of the intermediate transfer member to the recording medium, and the secondary transfer unit has the belt unit according to the present disclosure.

The image forming apparatus according to the present disclosure may further include a fixing unit that fixes the toner image transferred to the surface of the recording medium, an image carrier cleaning unit that cleans the surface of the image carrier after the transfer of the toner image and before charging, a static elimination unit that irradiates the surface of the image carrier with static elimination light after the transfer of the toner image and before the charging to eliminate static electricity, and the like. In the image forming apparatus according to the present disclosure, the portion including the developing unit may have a cartridge structure (process cartridge) which is attached to and detached from the image forming apparatus.

Hereinafter, an example of the image forming apparatus according to the present disclosure will be described. However, there is no limitation to this example. Hereinafter, among the parts shown in the drawings, main parts will be described, and others will not be described.

Figure 4:
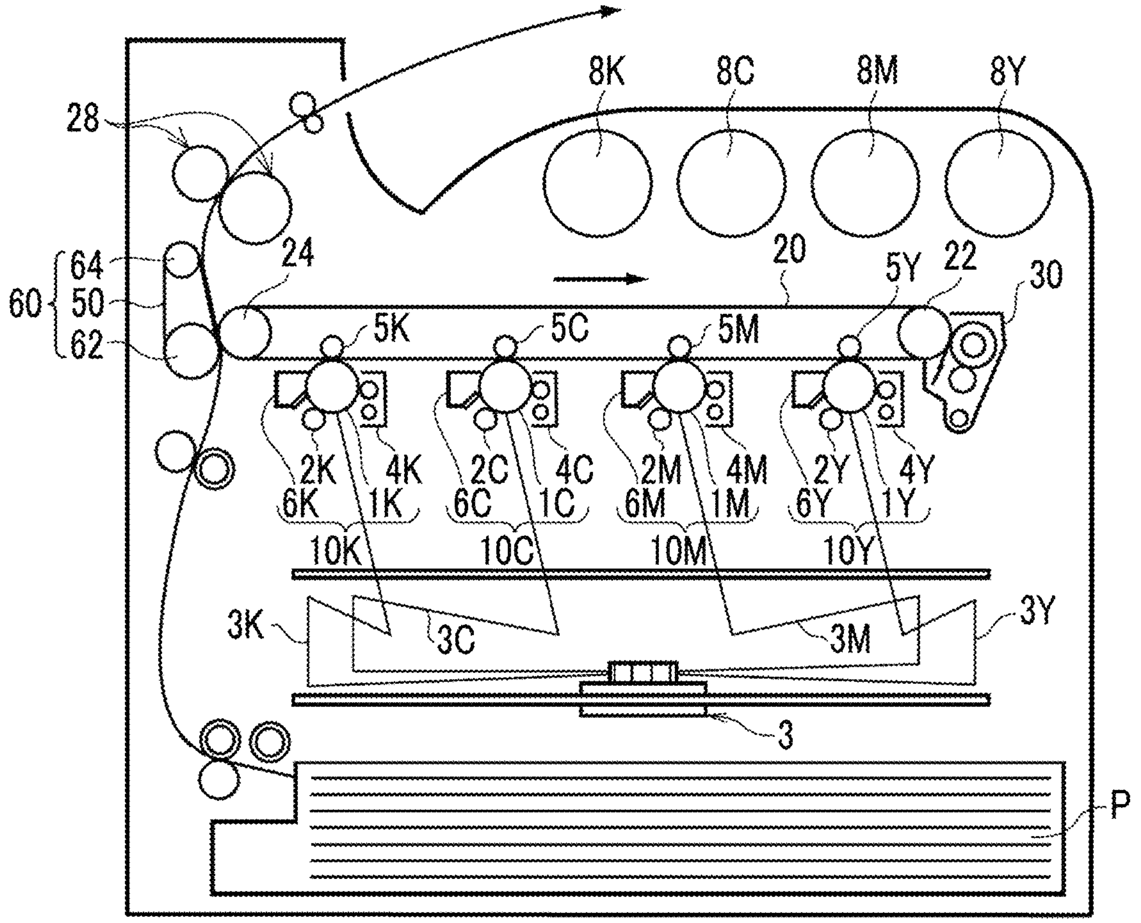
FIG. 4 is a schematic configuration diagram showing an example of an image forming apparatus according to the present disclosure.

FIG. 4 is a schematic configuration diagram showing an example of the image forming apparatus according to the present disclosure.

The image forming apparatus shown in FIG. 4 includes first to fourth electrophotographic image forming units 10Y, 10M, 10C, and 10K (image forming units) that output images of respective colors of yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. These units 10Y, 10M, 10C, and 10K may be process cartridges that are attachable to and detachable from the image forming apparatus.

An intermediate transfer belt 20 (an example of the intermediate transfer member) provided to extend on the upper side of the respective units 10Y, 10M, 10C, and 10K through the respective units. The intermediate transfer belt 20 is provided by being wound around a drive roll 22 and a support roll 24 that are in contact with the inner surface of the intermediate transfer belt 20, and runs in the direction from the first unit 10Y toward the fourth unit 10K. A force is applied to the support roll 24 in a direction away from the drive roll 22 by a spring or the like (not shown), and a tension is applied to the intermediate transfer belt 20 wound around the two rolls. An intermediate transfer belt cleaning device 30 is provided on the image holding surface side of the intermediate transfer 20 so as to face the drive roll 22.

Respective toners of yellow, magenta, cyan, and black contained in toner cartridges 8Y, 8M, 8C, and 8K are supplied to each of developing devices (each is an example of a developing unit) 4Y, 4M, 4C, and 4K of the respective units 10Y, 10M, 10C, and 10K.

Since the first to fourth units 10Y, 10M, 10C, and 10K have the same configuration and operation, herein, the first unit 10Y forming a yellow image and disposed on the upstream side in the running direction of the intermediate transfer belt will be described as a representative. The first unit 10Y includes a photoreceptor 1Y (an example of the image carrier). A charging roll (an example of a charging unit) 2Y that charges the surface of the photoreceptor 1Y to a potential determined in advance, an exposure device (an example of an electrostatic charge image forming unit) 3 that exposes the charged surface with a laser beam 3Y based on a color-separated image signal to form an electrostatic charge image, a developing device (an example of a developing unit) 4Y that develops the electrostatic charge image by supplying charged toner to the electrostatic charge image, a primary transfer roll (an example of a primary transfer unit) 5Y that transfers the developed toner image onto the intermediate transfer belt 20, and a photoreceptor cleaning device 6Y that removes the toner remaining on the surface of the photoreceptor 1Y after the primary transfer are arranged in order around the photoreceptor 1Y.

The primary transfer roll 5Y is arranged on the inner side of the intermediate transfer belt 20 at a position facing the photoreceptor 1Y. A bias power supply (not shown) for applying a primary transfer bias is connected to primary transfer rolls 5Y, 5M, 5C, and 5K of the respective units.

The belt unit 60 is a belt unit including the transfer belt 50 (an example of the belt according to the present disclosure). The belt unit 60 includes the transfer belt 50, the drive roll 62, and the support roll 64. The belt unit 60 is arranged outside the intermediate transfer belt 20 and is provided at a position facing the support roll 24. A bias power source (not shown) for applying a secondary transfer bias is connected to the belt unit 60.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ω·cm or less) substrate. The photosensitive layer has properties in that although this layer usually has a high resistance (resistance of a general resin), in a case where the photosensitive layer is irradiated with the laser beam, the specific resistance of the portion irradiated with the laser beam changes. Therefore, the surface of the charged photoreceptor 1Y is irradiated with the laser beam 3Y from the exposure device 3 according to the image data for yellow, which is sent from a control unit (not shown). In this manner, an electrostatic charge image having a yellow image pattern is formed on the surface of the photoreceptor 1Y.

The electrostatic charge image is an image formed on the surface of the photoreceptor 1Y by charging. This image is a so-called negative latent image formed in a manner in which the charges with which the surface of the photoreceptor 1Y is charged flow due to the reduction in the specific resistance of the portion of the photosensitive layer irradiated with the laser beam 3Y, but the charges in a portion not being irradiated with the laser beam 3Y remain.

The electrostatic charge image formed on the photoreceptor 1Y rotates to a predetermined development position as the photoreceptor 1Y runs. Then, at the development position, the electrostatic charge image on the photoreceptor 1Y is developed and visualized as a toner image by the developing device 4Y.

The developing device 4Y contains, for example, an electrostatic charge image developer that contains at least a yellow toner and a carrier. By being agitated in the developing device 4Y, the yellow toner undergoes triboelectrification, carries charges of the same polarity (negative polarity) as the charges with which the surface of the photoreceptor 1Y is charged, and is held on a developer roll (an example of a developer holder). As the surface of the photoreceptor 1Y passes through the developing device 4Y, the yellow toner electrostatically adheres to the neutralized latent image portion on the surface of the photoreceptor 1Y, and the latent image is developed by the yellow toner. The photoreceptor 1Y on which the yellow toner image is formed continuously runs at a speed determined in advance, and the developed toner image on the photoreceptor 1Y is transported to a primary transfer position determined in advance.

In a case where the yellow toner image on the photoreceptor 1Y is transported to the primary transfer position, a primary transfer bias is applied to the primary transfer roll 5Y, an electrostatic force from the photoreceptor 1Y toward the primary transfer roll 5Y acts on the toner image, and the toner image on the photoreceptor 1Y is transferred onto the intermediate transfer belt 20. The transfer bias applied at this time has a polarity (+) opposite to the polarity (−) of the toner. In the first unit 10Y, the transfer bias is set, for example, to +10 μA under the control of the control unit (not shown).

The primary transfer bias applied to the primary transfer rolls 5M, 5C, and 5K following the second unit 10M is also controlled according to the first unit.

In this manner, the intermediate transfer belt 20 to which the yellow toner image is transferred in the first unit 10Y is sequentially transported through the second to fourth units 10M, 10C, and 10K, the toner images of the respective colors are superimposed, and thus multiple transfer is performed.

The intermediate transfer belt 20 to which the toner images of four colors are multiple-transferred through the first to fourth units reaches a secondary transfer unit configured by the intermediate transfer belt 20, the support roll 24, and the belt unit 60. On the other hand, recording paper (an example of the recording medium) P is fed to the gap where the belt unit 60 and the intermediate transfer belt 20 are in contact with each other via a supply mechanism at a timing determined in advance, and the secondary transfer bias is applied to the support roll 24. The transfer bias that is applied at this time has a (−) polarity that is the identical polarity to the toner polarity (−), the electrostatic force from the intermediate transfer belt 20 toward the recording paper P acts on the toner image, and the toner image on the intermediate transfer belt 20 is transferred onto the recording paper P. The secondary transfer bias to be applied at this time is determined according to the resistance detected by a resistance detecting unit (not shown) that detects the resistance of the secondary transfer unit, and the voltage thereof is controlled.

The recording paper P with the toner image transferred thereto is sent to a pressure contact portion (nip portion) of a pair of fixing rolls of a fixing device (an example of a fixing unit) 28, the toner image is fixed to the recording paper P, and a fixed image is formed. The recording paper P, on which the fixing of the color image has been completed, is transported to a discharge unit, and a series of color image forming operations is ended.

As the recording paper P to which the toner image is transferred, plain paper that is used in electrophotographic copy machines, printers, or the like can be given as an example. Examples of the recording medium also include an OHP sheet, in addition to the recording paper P.

EXAMPLES

Hereinafter, the present exemplary embodiment will be described in more detail by illustrating examples. However, the present exemplary embodiment is not limited to the following examples. Unless otherwise specified, synthesis, treatment, production, and the like are performed at room temperature (24° C.±3° C.). In the following description, unless otherwise specified, "parts" and "%" are all based on mass.

Example 1

Preparation of Base Material Layer

- Chloroprene rubber (CR) (TSR-61, Tosoh Corporation) 100 parts
- Carbon black (#3030B, Mitsubishi Chemical Corporation) 25 parts
- Sulfur (Renogran S-80, Bayer) 1 part
- Zinc oxide (Renogran ZnO-80, Bayer) 6 parts
- Magnesium oxide (Kyowa Mag 150, Kyowa Chemical Industry Co., Ltd.) 4 parts
- Vulcanization accelerator (Noxeller M, manufactured by Ouchi Shinko Chemical Industry Co., Ltd.) 1 part
- Stearic acid 0.5 parts The above-described materials are mixed, put into a kneading extruder, extruded and molded, dried with hot air, and further heated for vulcanization to obtain a tubular member having a diameter (outer diameter) of 40 mm and an average thickness of 450 μm. The tubular member is cut to a length of 355 mm to obtain a base material layer A.

Preparation of Front Surface Layer and Back Surface Layer

1% by mass of a curing agent (Loctite WH-1, Henkel Japan Ltd.) is added to a polytetrafluoroethylene (PTFE)-containing urethane resin (Bonderite T862A, Henkel Japan Ltd.), and the mixture is diluted with water to adjust the amount of PTFE to 10% by mass. 0.5% by mass of a conductive agent (carbon black, #3030B, Mitsubishi Chemical Corporation) and 10.0% by mass of silicone resin particles (KMP-590, manufactured by by Shin-Etsu Chemical Co., Ltd., average particle diameter=2 μm) are added thereto and kneaded, and the obtained mixture is used as a coating liquid for a front surface layer.

In addition, in the coating liquid for a front surface layer, the amount of the conductive agent (carbon black, #3030B, Mitsubishi Chemical Corporation) is changed to 2.0% by mass, and this coating liquid is used as a coating liquid for a back surface layer.

The coating liquid for a front surface layer is sprayed onto the outer peripheral surface of the base material layer A while rotating the base material layer A with the central axis of the base material layer A in the horizontal direction. Next, hot air drying is performed at a temperature of 150° C. for 35 minutes to form a front surface layer. The average thickness of the front surface layer is set to 15 μm.

Next, the coating liquid for a back surface layer is also sprayed onto the inner peripheral surface of the base material layer A, and the coating liquid is dried with hot air in the same manner to form a back surface layer. The average thickness of the back surface layer is set to 15 μm.

In this manner, an endless belt is obtained.

Examples 2 to 4

An endless belt is obtained in the same manner as in Example 1, except that in Example 1, the amounts of the conductive agent (carbon black) in the front surface layer and the back surface layer are changed to the amounts shown in Table 1 and the amount of the conductive agent (carbon black) is changed such that the volume resistivity R2 in the base material layer is the value shown in Table 1.

Example 5

An endless belt is obtained in the same manner as in Example 4, except that the silicone resin particles are not added to the front surface layer and the back surface layer in Example 4.

Comparative Example 1

Preparation of Base Material Layer

EPDM rubber (product name: EPM 3045, manufactured by Mitsui Chemicals, Inc.) 100 parts Carbon black (#3030B, Mitsubishi Chemical Corporation) 20 parts The above-described materials are mixed with various additives, the mixture is put into a kneading extruder, extruded and molded, dried with hot air, and further heated for vulcanization to obtain a tubular member having a diameter (outer diameter) of 40 mm and an average thickness of 450 μm. The tubular member is cut to a length of 355 mm to obtain a base material layer B.

Preparation of Front Surface Layer and Back Surface Layer

A front surface layer and a back surface layer are formed in the same manner as in Example 1, except that in Example 1, the amounts of the conductive agent (carbon black) in the front surface layer and the back surface layer are changed to the amounts shown in Table 1 and the silicone resin particles are not added.

In this manner, an endless belt of Comparative Example 1 is obtained.

Comparative Example 2

Preparation of Base Material Layer

Polyamide resin (product name: UBESTA, manufactured by UBE Corporation) 100 parts Carbon black (#3030B, Mitsubishi Chemical Corporation) 15 parts The above-described materials are mixed, and using an extrusion molding machine, the mixture is heated and melted by tubular extrusion at an extrusion temperature of 220° C. to obtain a tubular member having a diameter (outer diameter) of 40 mm and an average thickness of 450 μm. The tubular member is cut to a length of 355 mm to obtain a base material layer C.

Preparation of Front Surface Layer and Back Surface Layer

A front surface layer and a back surface layer are formed in the same manner as in Example 1, except that in Example 1, the amounts of the conductive agent (carbon black) in the front surface layer and the back surface layer are changed to the amounts shown in Table 1 (that is, the conductive agent is not added), and the silicone resin particles are not added.

In this manner, an endless belt of Comparative Example 2 is obtained.

Comparative Examples 3 and 4

An endless belt is obtained in the same manner as in Example 1, except that in Example 1, the amounts of the conductive agent (carbon black) in the front surface layer and the back surface layer are changed to the amounts shown in Table 1 and the amount of the conductive agent (carbon black) is changed such that the volume resistivity R2 in the base material layer is the value shown in Table 1.

Volume Resistivity

The volume resistivity [log Ω] of the entire endless belt, the front surface layer, the base material layer, and the back surface layer is measured according to the above-described method. The results are shown in Table 1.

Evaluation

A secondary transfer belt unit is prepared by using the endless belt obtained in each example as a transfer belt. This secondary transfer belt unit is mounted on a modified version of an image forming apparatus DocuColor-7171P (FUJIFILM Business Innovation Corp.) as a secondary transfer unit to obtain an image forming apparatus.

Transferability

Using the above-described image forming apparatus, in an environment of a temperature of 10° C. and a humidity of 10%, 100 pieces of halftone images having an image density of 20% are continuously formed on a recording medium (paper, A3 size, basis weight: 82 g/m$^2$, thickness: 97 μm) at an applied voltage of 8 kV. The last ten images are visually observed, and the transfer performance is evaluated according to the following indexes.

Evaluation Indexes (Transferability/Density)

A: No transfer density unevenness is confirmed, and the density of the transferred image is 95% or more with respect to the required image density.

B: No transfer density unevenness is confirmed, and the density of the transferred image is 90% or more and less than 95% with respect to the required image density.

C: Transfer density unevenness (that is, a region in which the transfer image density is lower than the surroundings with respect to the required image density) is confirmed, and a region in which the transfer density unevenness occurs is 5% by area or more and 20% by area or less with respect to the image area.

D: Transfer density unevenness is confirmed, and a region in which the transfer density unevenness occurs is more than 20% by area with respect to the image area.

Evaluation Indexes (Transferability/Image History)

A: The image history (that is, the image in the previous cycle remains as a residual image in the image in the next cycle due to the remaining toner on the intermediate transfer member in the previous cycle) is not observed by either visual recognition or a CCD camera (100 times).

B: The image history is observed with the CCD camera (100 times), but is not observed by visual recognition.

C: The image history is observed by visual recognition, and the area of the image history that can be observed by visual recognition is 5% by area or more and 20% by area or less with respect to the image area.

D: The image history is observed by visual recognition, and the area of the image history that can be observed by visual recognition is more than 20% of the image area.

Stains on Paper Back Surface

In addition, in the transferability test, the occurrence of stains on the back surface of the paper (recording medium) are visually confirmed and evaluated according to the following indexes.

Evaluation Indexes

A: No stains are observed.

B: Although slight stains are observed, the area of the stains is less than 5% by area with respect to the image area.

C: Stains are observed, and the area of the stained region is 5% by area or more and 20% by area or less with respect to the image area.

D: Stains are observed, and the area of the stains is more than 20% of the image area.

Durability

After the operation of forming a halftone image with an image density of 5% on a recording medium (paper, A3 size, basis weight: 82 g/m$^2$, thickness: 97 μm) and transporting the recording medium is continuously performed 10000 times by using the image forming apparatus described above, 10 pieces of halftone images with an image density of 20% are formed on the recording medium, and the tenth image is visually observed. Further, the endless belt after image formation is removed from the image forming apparatus, and the outer peripheral surface of the endless belt is observed visually or at a magnification of 100 times using a CCD camera to confirm the surface state (the presence or absence of foreign matter). Based on these, the maintainability is evaluated according to the following indexes.

Evaluation Indexes

A: No abnormality is found in any of the image and the outer peripheral surface of the endless belt.

B: Roughness is observed on the outer peripheral surface of the endless belt, but no abnormality is observed in the image.

C: Abnormality is observed in the image, and roughness is observed in a region of 5% by area or more and 20% by area or less on the outer peripheral surface of the endless belt.

D: Abnormality is observed in the image, and roughness is observed in a region of more than 20% by area on the outer peripheral surface of the endless belt.

TABLE 1

| | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Volume resistivity [logΩ] | Entire belt | 9.1 | 9.2 | 8.2 | 10.4 | 10.3 | 7.2 | 11.3 | 9.7 | 8.5 |
| | Front surface layer R1 | 9.5 | 8.8 | 8.8 | 10.8 | 10.5 | 7.2 | 11.9 | 9.6 | 8.7 |
| | Base material layer R2 | 9.3 | 9.1 | 8.1 | 9.8 | 9.8 | 7.1 | 10.0 | 8.9 | 9.6 |
| | Back surface layer R3 | 8.9 | 9.6 | 7.2 | 9.1 | 9.0 | 7.2 | 11.9 | 9.6 | 8.7 |
| | R1 − R2 difference | 0.2 | 0.3 | 0.7 | 1.0 | 0.7 | 0.1 | 1.9 | 0.7 | 0.9 |
| | R2 − R3 difference | 0.4 | 0.5 | 0.9 | 0.7 | 0.8 | 0.1 | 1.9 | 0.7 | 0.9 |
| | (Front surface layer) | | | | | | | | | |
| Material | Base resin | Urethane resin | Urethane resin | Urethane resin | Urethane resin | Urethane resin | Urethane resin | Urethane resin | Urethane resin | Urethane resin |
| | Amount of conductive agent [% by mass] | 0.5 | 1.8 | 1.8 | 0.3 | 0.3 | 9.0 | 0 | 0.5 | 2.0 |
| | Siloxane | Contained | Contained | Contained | Contained | — | — | — | Contained | Contained |

TABLE 1-continued

| | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| (Base material layer) | | | | | | | | | | |
| | Elastic material | CR rubber | CR rubber | CR rubber | CR rubber | CR rubber | EPDM rubber | Polyamide | CR rubber | CR rubber |
| (Back surface layer) | | | | | | | | | | |
| | Base resin | Urethane resin | Urethane resin | Urethane resin | Urethane resin | Urethane resin | Urethane resin | Urethane resin | Urethane resin | Urethane resin |
| | Amount of conductive agent [% by mass] | 2.0 | 0.4 | 4.0 | 1.5 | 1.5 | 9.0 | 0 | 0.5 | 2.0 |
| Evaluation | Transferability/ Density | A | A | B | A | A | D | D | D | D |
| | Transferability/ Image History | A | A | A | B | B | C | D | C | C |
| | Stains on Paper Back Surface | A | A | A | A | B | D | D | C | C |
| | Durability | A | A | A | A | A | C | D | C | C |

From the results shown in Table 1, it can be seen that Examples have excellent transfer performance as compared with Comparative Examples.

Hereinafter, aspects of the present disclosure will be additionally described.

(((1)))

A transfer belt comprising:

three layers of a front surface layer, a base material layer including at least one elastic material selected from the group consisting of rubber and an elastomer, and a back surface layer, wherein a relationship between a volume resistivity R1 of the front surface layer, a volume resistivity R2 of the base material layer, and a volume resistivity R3 of the back surface layer in an environment of 25° C. and 55% RH satisfies Expression 1 or 2, $$R1 > R2 > R3, \quad \text{Expression 1}$$

$$R1 < R2 < R3. \quad \text{Expression 2}$$

(((2)))

The transfer belt according to (((1))), wherein a volume resistivity of the entire transfer belt in the environment of 25° C. and 55% RH is 8.0 log Ω or more and 11.0 log Ω or less.

(((3)))

The transfer belt according to (((2))), wherein the volume resistivity of the entire transfer belt in the environment of 25° C. and 55% RH is 8.5 log Ω or more and 10.0 log Ω or less.

(((4)))

The transfer belt according to any one of (((1))) to (((3))), wherein a difference between the volume resistivity R1 of the front surface layer and the volume resistivity R2 of the base material layer, and a difference between the volume resistivity R2 of the base material layer and the volume resistivity R3 of the back surface layer are both 0.1 log Ω or more.

(((5)))

The transfer belt according to (((4))), wherein the difference between the volume resistivity R1 of the front surface layer and the volume resistivity R2 of the base material layer, and the difference between the volume resistivity R2 of the base material layer and the volume resistivity R3 of the back surface layer are both 0.2 log Ω or more and 1.0 log Ω or less.

(((6)))

The transfer belt according to any one of (((1))) to (((5))), wherein the front surface layer and the back surface layer each contain a conductive filler in a range of 0.1% by mass or more and 8.0% by mass or less.

(((7)))

The transfer belt according to (((6))), wherein the front surface layer and the back surface layer each contain the conductive filler in a range of 0.5% by mass or more and 4.0% by mass or less.

(((8)))

The transfer belt according to any one of (((1))) to (((7))), wherein the front surface layer and the back surface layer contain a conductive filler, and a content of the conductive filler in one layer of the front surface layer and the back surface layer that has a higher volume resistivity is 0.1% by mass or more and 2.0% by mass or less, and a content of the conductive filler in the other layer of the front surface layer and the back surface layer that has a lower volume resistivity is 1.0% by mass or more and 8.0% by mass or less.

(((9)))

The transfer belt according to (((8))), wherein the content of the conductive filler in one layer of the front surface layer and the back surface layer that has a higher volume resistivity is 0.3% by mass or more and 1.8% by mass or less, and the content of the conductive filler in the other layer of the front surface layer and the back surface layer that has a lower volume resistivity is 1.5% by mass or more and 4.0% by mass or less.

(((10)))

The transfer belt according to any one of (((1))) to (((9))), wherein the base material layer contains at least one selected from the group consisting of chloroprene rubber, epichlorohydrin rubber, and a urethane elastomer as the elastic material.

(((11)))

The transfer belt according to any one of (((1))) to (((10))), wherein the front surface layer contains a base resin and particles of a resin having a siloxane bond, and a content of the particles of the resin having a siloxane bond with respect to the base resin is 1.0% by mass or more and 20.0% by mass or less.

(((12)))

The transfer belt according to (((11))), wherein the content of the particles of the resin having a siloxane bond with respect to the base resin is 2.0% by mass or more and 15.0% by mass or less.

(((13)))

A belt unit comprising:

the transfer belt according to any one of (((1))) to (((12))); and a plurality of rolls around which the transfer belt is wound in a state where a tension is applied, wherein at least one roll of the plurality of rolls is a drive roll that rotates the transfer belt, and the belt unit is attached to and detached from an image forming apparatus.

(((14)))

An image forming apparatus comprising:

an image carrier;

a charging unit that charges a surface of the image carrier;

an electrostatic charge image forming unit that forms an electrostatic charge image on the charged surface of the image carrier;

a developing unit that accommodates a developer containing toner and develops the electrostatic charge image formed on the surface of the image carrier by using the developer to form a toner image; and a transfer unit that includes the belt unit according to (((13))) and transfers the toner image to a recording medium.

(((15)))

The image forming apparatus according to (((14))), wherein the transfer unit includes an intermediate transfer member, a primary transfer unit that transfers the toner image to a surface of the intermediate transfer member, and a secondary transfer unit that transfers the toner image transferred to the surface of the intermediate transfer member to the recording medium, and the secondary transfer unit includes the belt unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A transfer belt comprising:

three layers of a front surface layer, a base material layer including at least one elastic material selected from the group consisting of rubber and an elastomer, and a back surface layer, wherein a relationship between a volume resistivity R1 of the front surface layer, a volume resistivity R2 of the base material layer, and a volume resistivity R3 of the back surface layer in an environment of 25° C. and 55% relative humidity satisfies Expression 1 or 2, $$R1>R2>R3, \qquad \text{Expression 1:}$$

$$R1<R2<R3, \text{ and} \qquad \text{Expression 2:}$$

a difference between the volume resistivity R1 of the front surface layer and the volume resistivity R2 of the base material layer, and a difference between the volume resistivity R2 of the base material layer and the volume resistivity R3 of the back surface layer are both 0.1 log Ω or more.

2. The transfer belt according to claim 1, wherein a volume resistivity of the entire transfer belt in the environment of 25° C. and 55% relative humidity is 8.0 log Ω or more and 11.0 log Ω or less.

3. The transfer belt according to claim 2, wherein the volume resistivity of the entire transfer belt in the environment of 25° C. and 55% relative humidity is 8.5 log Ω or more and 10.0 log Ω or less.

4. A belt unit comprising:

the transfer belt according to claim 3 and a plurality of rolls around which the transfer belt is wound in a state where a tension is applied, wherein at least one roll of the plurality of rolls is a drive roll that rotates the transfer belt, and the belt unit is attached to and detached from an image forming apparatus.

5. A belt unit comprising:

the transfer belt according to claim 2 and a plurality of rolls around which the transfer belt is wound in a state where a tension is applied, wherein at least one roll of the plurality of rolls is a drive roll that rotates the transfer belt, and the belt unit is attached to and detached from an image forming apparatus.

6. The transfer belt according to claim 1, wherein the difference between the volume resistivity R1 of the front surface layer and the volume resistivity R2 of the base material layer, and the difference between the volume resistivity R2 of the base material layer and the volume resistivity R3 of the back surface layer are both 0.2 log Ω or more and 1.0 log Ω or less.

7. A belt unit comprising:

the transfer belt according to claim 5; and a plurality of rolls around which the transfer belt is wound in a state where a tension is applied, wherein at least one roll of the plurality of rolls is a drive roll that rotates the transfer belt, and the belt unit is attached to and detached from an image forming apparatus.

8. The transfer belt according to claim 1, wherein the front surface layer and the back surface layer each contain a conductive filler in a range of 0.1% by mass or more and 8.0% by mass or less.

9. The transfer belt according to claim 8, wherein the front surface layer and the back surface layer each contain the conductive filler in a range of 0.5% by mass or more and 4.0% by mass or less.

10. A belt unit comprising:

the transfer belt according to claim 6; and a plurality of rolls around which the transfer belt is wound in a state where a tension is applied, wherein at least one roll of the plurality of rolls is a drive roll that rotates the transfer belt, and the belt unit is attached to and detached from an image forming apparatus.

11. The transfer belt according to claim 1, wherein the front surface layer and the back surface layer contain a conductive filler, and a content of the conductive filler in one layer of the front surface layer and the back surface layer that has a higher volume resistivity is 0.1% by mass or more and 2.0% by mass or less, and a content of the conductive filler in the other layer of the front surface layer and the back surface layer that has a lower volume resistivity is 1.0% by mass or more and 8.0% by mass or less.

12. The transfer belt according to claim 11, wherein the content of the conductive filler in one layer of the front surface layer and the back surface layer that has a higher volume resistivity is 0.3% by mass or more and 1.8% by mass or less, and the content of the conductive filler in the other layer of the front surface layer and the back surface layer that has a lower volume resistivity is 1.5% by mass or more and 4.0% by mass or less.

13. The transfer belt according to claim 1, wherein the base material layer contains at least one selected from the group consisting of chloroprene rubber, epichlorohydrin rubber, and a urethane elastomer as the elastic material.

14. The transfer belt according to claim 1, wherein the front surface layer contains a base resin and particles of a resin having a siloxane bond, and a content of the particles of the resin having a siloxane bond with respect to the base resin is 1.0% by mass or more and 20.0% by mass or less.

15. The transfer belt according to claim 14, wherein the content of the particles of the resin having a siloxane bond with respect to the base resin is 2.0% by mass or more and 15.0% by mass or less.

16. A belt unit comprising:

the transfer belt according to claim 1; and a plurality of rolls around which the transfer belt is wound in a state where a tension is applied, wherein at least one roll of the plurality of rolls is a drive roll that rotates the transfer belt, and the belt unit is attached to and detached from an image forming apparatus.

17. An image forming apparatus comprising:

an image carrier;

a charging unit that charges a surface of the image carrier;

an electrostatic charge image forming unit that forms an electrostatic charge image on the charged surface of the image carrier;

a developing unit that accommodates a developer containing toner and develops the electrostatic charge image formed on the surface of the image carrier by using the developer to form a toner image; and a transfer unit that includes the belt unit according to claim 16 and transfers the toner image to a recording medium.

18. The image forming apparatus according to claim 17, wherein the transfer unit includes an intermediate transfer member, a primary transfer unit that transfers the toner image to a surface of the intermediate transfer member, and a secondary transfer unit that transfers the toner image transferred to the surface of the intermediate transfer member to the recording medium, and the secondary transfer unit includes the belt unit.

* * * * *